US00RE35947E

United States Patent [19]

Kosinski et al.

[11] E Patent Number: Re. 35,947

[45] Reissued Date of Patent: Nov. 3, 1998

[54] OPTICAL ELEMENT HAVING DURABILITY ENHANCING LAYER

[75] Inventors: James Joseph Kosinski, Webster; Alfred John Amell, Rochester, both of N.Y.

[73] Assignee: Eastman Kodak Company, Rochester, N.Y.

[21] Appl. No.: 355,130

[22] Filed: Dec. 13, 1994

Related U.S. Patent Documents

Reissue of:

[64] Patent No.: 5,312,663
Issued: May 17, 1994
Appl. No.: 815,020
Filed: Dec. 27, 1991

[51] Int. Cl.[6] ..... B32B 3/00

[52] U.S. Cl. ..... 428/64.1; 428/64.2; 428/64.4; 428/64.7; 428/64.8; 428/457; 428/913; 430/270.1; 430/495; 430/945; 369/275.5; 369/283; 369/288

[58] Field of Search ..... 428/64.1, 64.2, 428/64.4, 64.7, 64.8, 457, 913; 430/270, 495, 945; 369/275.5, 283, 288

[56] References Cited

U.S. PATENT DOCUMENTS

| | | | |
|---|---|---|---|
| 4,933,222 | 6/1990 | Masuda | 428/64 |
| 4,981,743 | 1/1991 | Ho | 428/64 |
| 5,080,946 | 1/1992 | Takagisi | 428/64 |
| 5,102,709 | 4/1992 | Tachibana | 428/64 |

FOREIGN PATENT DOCUMENTS

| | | |
|---|---|---|
| 0 306 316 | 1/1988 | European Pat. Off. . |
| 29 25 765 A1 | 10/1980 | Germany . |
| A-57-181 443 | 2/1983 | Japan . |
| A-58-118 045 | 10/1983 | Japan . |
| A-62-067 742 | 8/1987 | Japan . |
| 63-79169 | 3/1988 | Japan . |
| A-63-004 441 | 6/1988 | Japan . |
| WO 91/10233 | 7/1991 | WIPO . |

*Primary Examiner*—Elizabeth Evans
*Attorney, Agent, or Firm*—John R. Everett

[57] ABSTRACT

An optical element is provide which has a durability enhancing layer. There is provided an optical disk comprising a support having on one surface thereof, in order:

a) a recording layer such that said recording layer does not cover the entire surface of said disk but leaves an annular portion at the outer diameter;

b) a reflective layer such that said reflective layer does not cover the entire surface of said disk but leaves an annular portion at the outer diameter;

c) a first protective layer having a thickness between about 2–20 μm, said protective layer being of a material having good adhesion to said support and covering a portion of the surface of said disk having said reflective layer, including at least a portion of said annular portion;

d) a second protective layer having a thickness of at least about 3 μm, said second layer covering at least the area of said surface having the reflective layer and having good adhesion to said first protective layer. In another aspect, there is provided a method wherein the first protective layer is spin coated and the second is screen printed.

25 Claims, 1 Drawing Sheet

OPTICAL ELEMENT HAVING DURABILITY ENHANCING LAYER

Matter enclosed in heavy brackets [ ] appears in the original patent but forms no part of this reissue specification; matter printed in italics indicates the additions made by reissue.

FIELD OF THE INVENTION

The present invention relates to optical recording elements. The invention particularly relates to durability enhancing overcoat layers for these elements.

BACKGROUND OF THE INVENTION

One of the currently popular forms of optical storage of information is the compact disk or CD. Digital information is stored in the form of high optical density marks or pits on an otherwise reflective background. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording media which, when recorded in real time, produces a record that mimics the conventional CD on read out. In this manner, information can be added to the CD and the CD can be used on a conventional CD player. This adds additional complexity to the CD since a layer that can be recorded upon is interposed between the support and the reflecting layer.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a conventional CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One important characteristic of the finished element is the durability of the surface of the element. As noted, the support is coated with a recording layer, a reflective layer and an optional protective layer. Since the read-out of the element is through the support, characterizing information for the CD, such as logos, designs and printed information can be applied by screen printing to the protective layer.

The protective layer itself can be applied by a variety of means. Spin coating of a UV curable composition is common for many different types of optical elements. Workers have generally concentrated on finding coating compositions having desirable properties.

We have found that there are a number of problems associated with conventional overcoat layers and methods, particularly when applied to writable CD types of optical elements. In particular, it has not been possible to obtain layers of sufficient scratch resistance using a single spin coated layer. Such layers do not have sufficient thickness so as to provide the necessary protection. Spin coating multiple layers so as to build up thickness is possible but is economically not desirable. It has been suggested that thicker layers can be produced using screen printing methods but screen printing onto the reflective layer of the writable CD type of element produces unacceptable block error rates. In addition, there is a problem of providing adequate adhesion of the durability enhancing layer to the disk. This is complicated by the complex structure of the writable CD element since, compared to a conventional CD, there is an additional recording layer interposed between the durability enhancing layer and the support. Adhesion among all of these layers has been a problem. Thus, there is a continuing need for improved durability enhancing layer structures for writable CD materials.

SUMMARY OF THE INVENTION

In accordance with the present invention there is provided an optical disk comprising a support having on one surface thereof, in order:

a) a recording layer such that said recording layer does not cover the entire surface of said disk but leaves an annular portion at the outer diameter;

b) a reflective layer such that said reflective layer does not cover the entire surface of said disk but leaves an annular portion at the outer diameter;

c) a first protective layer having a thickness between about 2–20 μm, said protective layer being of a material having good adhesion to said support and covering a portion of the surface of said disk having said reflective layer, including at least a portion of said annular portion;

d) a second protective layer having a thickness of at least about 3 μm, said second layer covering at least the area of said surface having the reflective layer and having good adhesion to said first protective layer.

In accordance with another aspect of the invention, there is provided a method of making the above described structure, said method including, in order, the steps of a) providing a recording layer that does not cover the entire surface of the support but leaves an annular portion at the outer diameter;

b) providing a reflective layer that does not cover the entire surface of the support but leaves an annular portion at the outer diameter;

c) spin coating a protective layer having a thickness between about 2–20 μm, said protective layer being of a material having good adhesion to said support and covering a portion of the surface of said disk having said reflective layer and covering at least a portion of said annular portion;

d) screen printing a second protective layer having a thickness of at least about 3 μm, said second layer covering at least the area of said surface having the reflective layer and having good adhesion to said first protective layer.

DETAILED DESCRIPTION OF THE INVENTION

Figure 1:
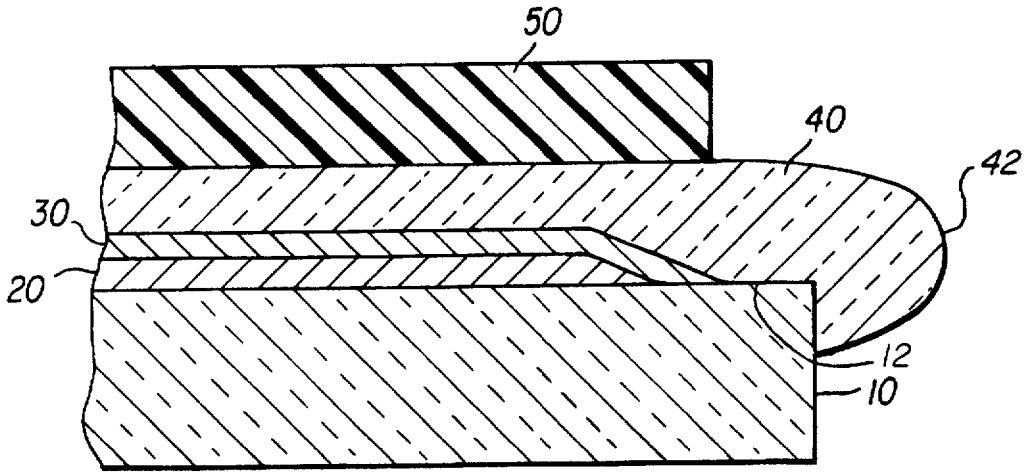
FIG. 1 is a schematic representation, in cross section, of an element of the invention at the outer edge of the element.

The optical element of the invention includes at least four layers. The support has thereon, in order, an optical recording layer; a reflective layer; a first protective layer; and a second protective layer. Other layers, such as very thin subbing layers may also be included. Each of the primary layers of the elements and methods of the invention will be described in detail.

The first protective layer must have good adhesion to the support and the second protective layer must have good adhesion to the first protective layer. Good adhesion is achieved when the structure survives the adhesion test described more completely below.

The Support

Supports can be made from optically transparent resins with or without surface treatment. The preferred resins are polycarbonates and polyacrylates.

Recording Layer

The recording layer can be any of a variety of materials. Useful materials are described for example in U.S. Pat. No. 4,940,618, European Patent Application 0,353,393 and Canadian Patent Application 2,005,520.

In the U.S. and the European applications mentioned above, the preferred dyes for the recording layer are indodicarbocyanine dyes. The Canadian application mentioned above describes a large number of phthalocyanine dyes. Mixtures of phthalocyanine dyes from Mitsui Toatsu are also useful.

One preferred recording layer is described in copending commonly assigned U.S. Ser. No. 716,863, filed 18 Jun. 1991 in the name of Kovacs et al entitled: SULFONAMIDE OR AMIDE SUBSTITUTED PHTHALOCYANINES FOR OPTICAL RECORDING. These dyes are preferred since they provide the necessary optical properties while being inexpensive to make.

Useful addenda for the recording layer include stabilizers, surfactants, binders and diluents.

Coating solvents for the recording layer are selected to minimize their effect on the support. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methow-2-propanol, methy ethyl ketone, 4-hydroxy-4-methyl-2-pentanone, hexane, cyclohexane, ethylcyclohexane, octane, benzene, toluene, and xylene. Other less desirable solvents include water, dimethylsulfoxide and sulfuric acid. Preferred solvents are hydrocarbon solvents and alcohol solvents since they have the least effect on the preferred polycarbonate supports.

In accordance with the invention, the recording layer is not coextensive with entire surface of the disk. Rather, an annular portion on the outside diameter of the disk is free from this recording layer. This is important for the durability of the entire structure since is allows the protective layer to directly contact the support material.

The Reflective Layer

The reflective layer can be any of the metals conventionally used for optical recording materials. Useful metals can be vacuum evaporated or sputtered and include gold, silver, aluminum and copper and alloys thereof. Gold is the preferred reflective layer material.

As with the recording layer, the reflective layer is not coextensive with the entire surface of the disk. It can cover a slightly larger area than does the recording layer but is still necessary to leave some annular portion on the outside diameter of the disk so that the protective layer, provided next, can directly contact the support material. This essentially encapsulates the reflective layer thereby improving adhesion and reducing corrosion.

The First Protective Layer

The first protective layer can consist of any material which can be applied as a fluid and then caused to harden. Examples include: solvent cast materials consisting of a polymer dissolved in a solvent which subsequently evaporates (e.g. Cellulose Nitrate); thermally curable materials, such as an epoxy, a polyimide, RTV Silicon, Urethane; a photo acrylate or other photoinitiated crosslinkable system; or a combination of the above. Photocurable systems are preferred because they are quick (no wait while the solvent evaporates) and the lack of a solvent reduces potential health or environmental concerns.

The material of the first protective layer should be such that it can be spin coated. Generally, the viscosity should be low so that the resulting layer is relatively thin, for example between 2 and 20 μm. The viscosity for materials that are coated to form the first protective layer, for example, is preferably between about 6 and about 300 cp. Spin coating is a well know type of coating process for this type of material in the CD art. Spin coating produces a layer that provides for a very low level of errors as measured by a block error rate tester.

Preferred materials for the first protective layer are photo (usually UV) curable acrylates which are commercially available. For example, mixtures of mono- di- and tri-acrylates with an initiator is available as Diacure SD-17® from Dainippon Ink & Chemical, 35–58, 3-Chrome, Sakashita, Itabashi-Ku, Tokyo. Alternative materials are described in Japanese Kokai JP 268178 5 Jun. 91.

The Second Protective Layer

The compositions that are useful for the second protective layer are similar to those that are useful for the first. However, this layer is coated using screen printing methods and the physical properties of the materials should therefore be adjusted for this process. In particular, the materials are relatively thick materials and are commonly referred to as "inks" while the materials for the first protective layer are commonly referred to as lacquers.

Specific useful materials include a photo (usually UV) curable acrylate ink 3727 available from Naz-Dar/KC Inc., 15555 W. 108th St., Lenexa Kans. Another useful material is "Pasta de Taglio"® available from F.LLI Manoukian—Frama Industria Chimica, 22070 Luisago (Como) Italy.

The screen printing method used to make the second protective layer is conventional. The composition is coated on the surface of a conventional screen. The material is forced through the openings in the screen and then contacted with the surface of the disk to be coated. The screen can be patterned using a photoresist for example, so as to produce the desired shape for the layer. As noted, the shape of the second protective layer is such that the layer covers the entire recording layer, the entire reflective layer and substantially all of the first protective layer. Curing of the layer is by conventional photo (UV) exposure as is known in this art.

After curing, the second protective layer can itself be printed upon by another screen printing step. In this step, information in the form of designs, logos and human readable information can be placed on the outermost surface of the disk.

FIG. 1 shows a cross section (not to scale) of the element of the invention at the outer diameter of the element. There is shown a support 10 having four layers thereon. Recording layer 20 has thereon reflecting layer 30, a first protective layer 40 and a second protective layer 50. First protective layer 40 covers the annular portion 12 of the substrate not covered by recording layer 20 and reflective layer 30. The second protective layer covers the first protective layer at least in the region where it is desired to record information.

An important preferred feature is the portion of the first protective layer that extends beyond, and covers a portion of, the edge of the substrate. This is generally indicated by portion 42 of first protective layer 40. It was found that this extension of the protective layer substantially prevents unwanted chipping of the coated layers and substrate if the edge of the disk is subjected to an impact on a hard surface.

Figure 2:
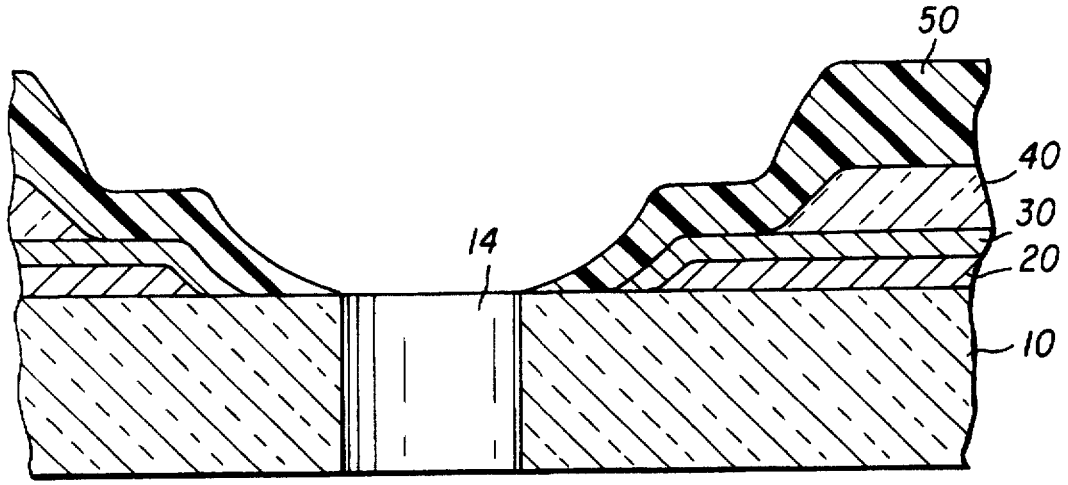
FIG. 2 is a schematic representation, in cross section, of an element of the invention near the center of the element.

FIG. 2 is a cross section (again not to scale) of the element of the invention around the center hole, 14, of the disk. There is shown that the second protective layer 50 can directly contact the reflective layer 30 near the center of the element. This is because the inner most portion of the recording layer of the disk is not used to record information. Thus, there is no need to improve the block error rate in this portion. As shown, second protective layer 50 extends over the entire surface of support 10. Alternatively, there can be an annular protion of the support (not shown) at the center of the disk around hole 14 that is not covered by any of the coatings.

General

The element of the invention can have prerecorded ROM areas as described in U.S. Pat. No. 4,940,618. The surface of the substrate can have a separate heat deformable layer as described in U.S. Pat. No. 4,990,388. Both of these patents are assigned to Taiyo Yuden.

In the examples which follow, several tests are performed on the various elements. The test used to determine the scratch resistance is performed on a Single Arm Scratch Tester. Block Error Rate or BLER is measured and the adhesion is measured. These tests are described as follows:

Single Arm Scratch

The single arm scratch tester consists of a platform upon which the disc to be tested is held. The platform and disk can be translated in a horizontal direction by a stepper motor. An arm is mounted on a pivot such that one end can be raised from or lowered to the disc surface. The end of the arm on the side of the pivot opposite from the disc contains a counterweight which maintains the arm in balance. At a distance of 23 mm from the pivot a 102 μm diameter sapphire stylus is mounted on the underside of the arm. Calibrated brass weights can be mounted on the top side of the arm to create the desired load. Once an appropriate weight is mounted, the stylus is lowered gently to the disc surface. The arm and stylus are arranged so that when the stylus contacts the disc it is perpendicular to the surface. The disc is then translated under the stylus at a speed of approximately 25 mm/sec. Depending on the load applied, a scratch of a particular depth is created. The arm is then translated a short distance (about 10 mm) in a direction perpendicular to the direction of the scratch. A new weight is mounted and the process repeated, creating a new scratch parallel to the original scratch. This procedure is repeated until the range of stylus load of interest is covered. Typically, the load is varied in steps of 5 grams, although other steps are possible, depending on the resolution desired.

The resulting scratches are observed under a low power microscope. Failure is defined as the load at which delamination of any of the various layers is observed.

Block Error Rate

The discs are played on a commercially available CD tester (CDCATS, available from Enterprise Corporation of America, 1200 Valley West Drive, West Des Moines, Iowa). The tester reports the Block Error Rate (BLER) of the disc. BLER is the rate at which errors in the data are detected by the error detection and correction circuits in CD players and is an industry accepted measure of the integrity of the data on a Compact Disc.

Adhesion

About 20 mm of Scotch brand tape, manufactured by the 3M Company, is applied to the surface to be tested such that 10 mm sticks to the surface and 10 mm remains free. The portion attached to the surface is rubbed until the matte appearance of the tape is uniform. The free end of the tape is slowly pulled in a direction perpendicular to the surface to which the tape is applied, until the tape is removed from the surface. No portion of the coated layer which is being tested should be removed by the tape.

The following examples are presented for a further understanding of the invention.

COMPARATIVE EXAMPLE 1

A recordable CD disc was prepared according to methods known in the art (See, for example, U.S. Pat. No. 4,990,388 assigned to Taiyo Yuden.) A dye which absorbs light with a wavelength in the vicinity of 780 nm was dissolved in a solvent and then applied to a polycarbonate substrate using a standard spin coating technique. This resulted in a coating of dye on the substrate all the way to the edge of the disk. The layer had a thickness of between 100 nm and 200 nm.

The dye coated substrate was then placed in a vacuum chamber through which argon flows at a rate of about 40 sccm. Gold was then deposited on to the dye using a standard DC sputtering technique such that the gold layer had a thickness of about 100 nm.

After gold coating, a thin (2–12 μm), UV curable lacquer (Diacure SD-17® from Dainippon Ink & Chemical, 35–58, 3-Chrome, Sakashita, Itabashi-Ku, Tokyo) was applied to the CD using a spin coating process. In this process a disc was placed on a turntable (held by a vacuum chuck) and rotated at a low speed (50–150 RPM). During this low speed rotation, the lacquer was applied to the center portion of the disc from a reservoir/pump system via a movable arm and small gage nozzle (14–17 ga) (corresponds to an inner diameter of 1.6–1 mm). After a sufficient amount of lacquer had been applied, the arm/nozzle was removed and the rotation speed increased to about 3500 rpm. This higher speed rotation leveled the lacquer over the entire disc surface. The disc was then removed and the lacquer polymerized by exposure to UV radiation. This photopolymerized lacquer layer constitutes a first protective layer.

This process results in the entire surface of the disc being covered by, in sequence, a recording layer of the dye, a reflective layer of gold and first protective layer of lacquer.

The resulting disc was tested using a single arm scratch tester and failed when the stylus load exceeded 60 grams. This disc was then exposed to various edge impact forces.

Chipping and delamination of the coated layers occurred when the edge of the disk was subjected to substantial impact against a hard surface.

COMPARATIVE EXAMPLE 2

A disc was prepared as in the comparative example above except that after the dye was coated, and prior to the gold coating, the disc was subjected to an edge wash process. In this process the disc was caused to spin while a fluid capable of dissolving the dye was directed through a small gauge nozzle toward the outer diameter of the disc. This resulted in an annular ring approximately 1.4 mm wide, located at the very outer diameter of the disc, being free from dye.

The disc was then placed in the vacuum system and the gold was sputtered onto the dye layer. The vacuum system had mounted in it a mask disposed so as to prevent gold from being deposited on the outer 0.7 mm annulus of the disc.

The process described in Comparative Example 1 was used to coat the lacquer layer over the entire disc surface. No chipping or delamination of the coated layers was observed after the disc was subjected to substantial edge impact. However, the scratch resistance of the disk was unchanged.

EXAMPLES 1–9

Several discs were prepared according to Comparative Example 2. On each of these discs a second protective layer was coated by a screen printing process.

The screen printing process begins by mounting a screen or mesh into a frame under tension. The screen was coated with a photographic emulsion into which the required image is exposed. This emulsion was then developed to form a positive image. In this case the image was simply a disc of dimension equal to that of the disk.

The "mesh" of the screen corresponds to the number of threads per inch (which in turn, corresponds to threads per 2.54 cm). Thus, a lower "mesh" number indicates a more open screen and correspondingly, a thicker layer.

A UV curable ink was applied to one side of the screen and a squeegee passed over the screen to equally fill the mesh openings with ink. The coated side of the disc was then brought into contact with the opposite side of the screen, resulting in the transfer of the ink from the screen to the disc. The ink was then cured by exposure to UV radiation. This cured ink layer comprises the second protective layer.

The ink contained no pigmentation, and so was transparent and colorless. The ink can be modified by adding a particulate suspension (called a "matte"). Discs were prepared using different degrees of matte, different thickness of ink (by changing the screen mesh), and inks from two manufacturers.

When the samples were prepared using the clear UV curable acrylate ink "Pasta de Taglio"® and the matte agent "Opacizzante"® (silicon dioxide particles) both produced by F.LLI Manoukian—Frama Industria Chimica, 22070 Luisago (Como) Italy, testing using the single arm scratch tester demonstrated that the discs failed at the following loads:

Single Arm Scratch

| | Mesh Size | | |
|---|---|---|---|
| % Matte | 158 | 196 | 390 |
| 0 | 250 ± 10 | 213 ± 10 | 210 ± 10 |
| 50 | 350 ± 30 | 247 ± 5 | 243 ± 40 |
| 100 | 353 ± 80 | 370 ± 30 | 245 ± 5 |

For these discs the second durability layer had the following thicknesses, measured in micrometers:

Thickness

| | Mesh Size | | |
|---|---|---|---|
| % Matte | 158 | 196 | 390 |
| 0 | 21.8 | 19.9 | 10.5 |
| 50 | 20.8 | 13.6 | 9.3 |
| 100 | 17.9 | 6.1 | 3.1 |

EXAMPLES 10–19

Examples 1–9 were repeated except that the clear ink 3727 and the matte agent RB1150, both manufactured by Naz-Dar/KC Inc., 15555 W. 108th St., Lenexa Kans. were used. In this case the discs failed at the following loads:

Single Arm Scratch

| | Mesh Size | | |
|---|---|---|---|
| % Matte | 158 | 196 | 390 |
| 0 | 380 ± 20 | 330 ± 10 | 225 |
| 50 | 310 ± 90 | 380 | 250 |
| 100 | 360 | 300 ± 90 | 280 |

For these discs the second durability layer had the following thicknesses, measured in micrometers:

Thickness

| | Mesh Size | | |
|---|---|---|---|
| % Matte | 158 | 196 | 390 |
| 0 | 22.0 | 17.9 | 10.2 |
| 50 | 24.8 | 18.8 | 13.3 |
| 100 | 24.6 | 23.6 | 10.8 |

In each case, durability tends to improve with increased coarseness of the mesh and increased degree of matte.

EXAMPLE 20

A disc was prepared according to examples 10–19, except that the spin coating of the first protective layer began at a radius of about 22 mm. This created an annular ring of reflective layer between the radii of 19 and 22 mm which was free from the first protective layer. A disc identification code was written in this area, and then the second protective layer was screen printed over the entire disc surface. The durability of the disc within the recording area, as measured by the single arm scratch tester, was maintained.

EXAMPLE 21

Discs were prepared in accordance with this invention, except that the first protective layer (the spin coated lacquer) began at a radius of about 30 mm. This caused the second protective layer (the screen printed "ink") to be in direct contact with the reflective layer in that portion of the recording region located at a radius of less than 30 mm. Digital information was recorded beginning at the inner recording radius (about 22 mm) and extending substantially past a radius of 35 mm.

These discs were then played on a commercially available CD tester (CDCATS, available from Enterprise Corporation of America, 1200 Valley West Drive, West Des Moines, Iowa). The tester reports the Block Error Rate (BLER) of the disc. BLER is the rate at which errors in the data are detected by the error detection and correction circuits in CD players and is an industry accepted measure of the integrity of the data on a Compact Disc.

On each disc tested, the BLER within the region where the second protective layer was in direct contact with the reflector layer was greater than 260 errors/sec. In the region where the second protective layer was separated from the reflector by the first protective layer the BLER was less than 40 errors/sec. Industry standards for CD audio discs require the BLER to be less than 200 errors/sec. No industry standard currently exists for BLER in CD data discs, but values of <50 errors/sec are commonly specified. For comparison, discs prepared with the first and second protective layers covering the entire recording area had BLER of <40 errors/sec.

The durability of the disc in the area where the second protective layer was coated directly on to the gold reflector was determined using the single arm scratch tester The average load to failure was 161±18 grams. This represents a significant reduction from the load to failure of 280 grams observed when both protective layers are present.

From this we conclude that it is unacceptable to screen print the second protective layer directly on the reflector layer.

The invention has been described with particular reference to preferred embodiments thereof but it will be understood that variations and modifications can be effected within the spirit and scope of the invention.

What is claimed is:

1. An optical disk comprising a support material formed of an optically transparent resin, having thereon:

a) a recording layer such that said recording layer does not cover the entire surface of said disk but leaves an annular portion of approximately 1.4 mm at the outer diameter;

b) a reflective layer such that said reflective layer does not cover the entire surface of said disk but leaves an annular portion of approximately [0.77] *0.7* mm at the outer diameter;

c) a first protective layer having a thickness between about 2–20 μm, said protective layer being a resinous material having good adhesion to said support and covering a portion of the surface of said disk having said reflective layer, including at least a portion of said annular portion;

d) a second protective layer having a thickness of about 3 μm, said second layer covering at least the area of said surface having the reflective layer and having good adhesion to said first protective layer.

2. An optical disk according to claim 1 wherein said support is a polycarbonate and said protective layers are photo curable acrylates; the acrylates in said first protective layer having the consistency of a lacquer and the acrylates in said second protective layer having the consistency of an ink.

3. An optical disk according to claim 1 wherein said first protective layer extends over the edge of the disk.

4. An optical disk according to claim 1 wherein said second protective layer includes matte particles.

5. An optical disk according to claim 4 wherein said particles are silicon dioxide.

*6. An optical disk comprising a support material formed of an optically transparent resin, having thereon:*

*a recording layer such that said recording layer does not cover the entire surface of said disk but leaves an annular portion of approximately 1.4 mm at the outer diameter;*

*a reflective layer such that said reflective layer does not cover the entire surface of said disk but leaves an annular portion of approximately 0.7 mm at the outer diameter;*

*a first protective layer having a thickness between about 2–20 μm, said protective layer being a resinous material having good adhesion to said support and covering a portion of the surface of said disk having said reflective layer, including at least a portion of said annular portion; and*

*a second protective layer having a thickness of 3.1–24.8 μm, said second layer covering at least the area of said surface having the reflective layer and having good adhesion to said first protective layer.*

*7. An optical disk according to claim 6, wherein said second protective layer has a thickness of 3.1–21.8 μm.*

*8. An optical disk according to claim 6, wherein said second protective layer has a thickness of 10.2–24.8 μm.*

*9. An optical disk according to claim 6, wherein said recording layer, said reflective layer, and said first protective layer are positioned between said substrate and said second protective layer with said first protective layer being adjacent said second protective layer, said recording layer being adjacent said support, and said reflective layer being between said first protective layer and said recording layer.*

*10. An optical disk according to claim 6, wherein said support is selected from the group consisting of polycarbonates and polyacrylates.*

*11. An optical disk according to claim 6, wherein said reflective layer is formed from a metal selected from the group consisting of gold, silver, aluminum, copper, and alloys thereof.*

*12. An optical disk according to claim 6, wherein said first and second protective layers are prepared from materials selected from the group consisting of photocurable materials and thermally curable materials.*

*13. An optical disk according to claim 6, wherein said support is a polycarbonate and said first and second protective layers are photocurable acrylates, the acrylates in said first protective layer having the consistency of a lacquer and the acrylates in said second protective layer having the consistency of an ink.*

*14. An optical disk according to claim 6, wherein said first protective layer extends over the edge of the disk.*

*15. An optical disk according to claim 6, wherein said second protective layer includes matte particles.*

*16. An optical disk comprising a support material formed of an optically transparent resin, having thereon:*

*a recording layer such that said recording layer does not cover the entire surface of said disk but leaves an annular portion at the outer diameter;*

*a reflective layer such that said reflective layer does not cover the entire surface of said disk but leaves an annular portion at the outer diameter;*

*a first protective layer having a thickness between about 2–20 μm, said protective layer being a resinous material having good adhesion to said support and covering a portion of the surface of said disk having said reflective layer, including at least a portion of said annular portion; and*

*a second protective layer having a thickness of 3.1–24.8 μm, said second layer covering at least the area of said surface having the reflective layer and having good adhesion to said first protective layer.*

*17. An optical disk according to claim 16, wherein said second protective layer has a thickness of 3.1–21.8 μm.*

*18. An optical disk according to claim 16, wherein said second protective layer has a thickness of 10.2–24.8 μm.*

*19. An optical disk according to claim 16, wherein said recording layer, said reflective layer, and said first protective layer are positioned between said substrate and said second protective layer with said first protective layer being adjacent said second protective layer, said recording layer being adjacent said support, and said reflective layer being between said first protective layer and said recording layer.*

*20. An optical disk according to claim 16, wherein said support is selected from the group consisting of polycarbonates and polyacrylates.*

*21. An optical disk according to claim 16, wherein said reflective layer is formed from a metal selected from the group consisting of gold, silver, aluminum, copper, and alloys thereof.*

*22. An optical disk according to claim 16, wherein said first and second protective layers are prepared from materials selected from the group consisting of photocurable materials and thermally curable materials.*

*23. An optical disk according to claim 16, wherein said support is a polycarbonate and said first and second protective layers are photocurable acrylates, the acrylates in said first protective layer having the consistency of a lacquer and the acrylates in said second protective layer having the consistency of an ink.*

*24. An optical disk according to claim 16, wherein said first protective layer extends over the edge of the disk.*

*25. An optical disk according to claim 16, wherein said second protective layer includes matte particles.*

* * * * *